(12) United States Patent
Lichoulas et al.

(10) Patent No.: US 8,043,013 B2
(45) Date of Patent: Oct. 25, 2011

(54) SPLICED-ON CONNECTOR SYSTEM AND METHOD, SPLICER, AND CONNECTOR HOLDER FOR PRODUCING THE SAME

(75) Inventors: Ted Lichoulas, Simpsonville, SC (US); Kevin Monroe, Greenbrier, AR (US); Don Bullman, Boiling Springs, SC (US); Douglas Duke, Simpsonville, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 0 days.

(21) Appl. No.: 12/065,374

(22) PCT Filed: Sep. 5, 2007

(86) PCT No.: PCT/US2007/019303
§ 371 (c)(1),
(2), (4) Date: Feb. 29, 2008

(87) PCT Pub. No.: WO2008/030432
PCT Pub. Date: Mar. 13, 2008

(65) Prior Publication Data
US 2009/0162019 A1    Jun. 25, 2009

Related U.S. Application Data

(60) Provisional application No. 60/842,381, filed on Sep. 6, 2006, provisional application No. 60/824,824, filed on Sep. 7, 2006.

(51) Int. Cl.
*G02B 6/255* (2006.01)

(52) U.S. Cl. ............................................. 385/99; 385/53
(58) Field of Classification Search .................... 385/62, 385/66, 81, 84, 95–99
See application file for complete search history.

(56) References Cited

U.S. PATENT DOCUMENTS

| | | | |
|---|---|---|---|
| 4,902,095 A | 2/1990 | Baker et al. | |
| 5,367,594 A | 11/1994 | Essert et al. | |
| 5,465,313 A | 11/1995 | Belenkiy et al. | |
| 5,748,819 A * | 5/1998 | Szentesi et al. | 385/60 |
| 6,340,249 B1 | 1/2002 | Hayes et al. | |
| 7,369,738 B2 * | 5/2008 | Larson et al. | 385/134 |
| 2005/0180705 A1* | 8/2005 | Elkins et al. | 385/100 |
| 2007/0127875 A1* | 6/2007 | Allen et al. | 385/95 |

* cited by examiner

*Primary Examiner* — Sarah Hahm
(74) *Attorney, Agent, or Firm* — Sughrue Mion, PLLC

(57) ABSTRACT

Provided is a spliced-on connector system which includes a connector body, an incoming fiber which is spliced to the connector body, a splice sleeve which covers a splice point at which the incoming fiber is spliced to the connector body, and an extender tube which covers the splice sleeve. Also provided is a method of producing the spliced-on connector system; a holder including a depression which holds a connector body in a position in which the connector body is spliced to an incoming fiber, the holder being disposed inside a splicer which splices the connector body to the incoming fiber; and a splicer including a tube heater which heat-shrinks a splice sleeve over a splice point at which a connector body is spliced to an incoming fiber, the tube heater accommodating the connector holder which holds the connector body.

11 Claims, 17 Drawing Sheets

SPLICED-ON CONNECTOR SYSTEM AND METHOD, SPLICER, AND CONNECTOR HOLDER FOR PRODUCING THE SAME

CROSS-REFERENCE TO RELATED APPLICATIONS

This application claims priority from U.S. Provisional Application No. 60/842,381 filed on Sep. 6, 2006 and U.S. Provisional Application No. 60/824,824 filed on Sep. 7, 2006, the disclosures of which are incorporated herein by reference.

BACKGROUND OF INVENTION

1. Field of Invention

Apparatuses and methods consistent with the present invention relate to a spliced-on connector system and a method, a splicer, and a connector holder for producing the same.

2. Description of the Related Art

A common way of terminating a cable for fiber to the premises (FTTP) applications is to splice a fiber optic pigtail onto a drop cable. In order to do this, some type of fiber management tray and procedure must be incorporated into the Optical Network Terminal (ONT). The fiber management process can require some skill to properly measure lengths and route the lengths inside the ONT. The measuring/routing process adds time and cost to the installation process.

Additionally, splicing on a pigtail is a different process from terminating either copper or coaxial cables. With both of these cables, the connector is placed at the end of the cable.

Another way of terminating cables at the customer premises includes using mechanical splices or field-installable connectors. However, mechanical splices and field installable connectors have not been proven to be reliable for long periods of time because of environmental changes. They also introduce back reflections which significantly affect the output of analog video systems and very high data rate digital video systems.

An alternative method is to use pre-terminated cables, but this method is very expensive.

Splicing on a connector is possible, but requires a specially designed connector and piece of equipment which is not very common in typical FTTP applications. In particular, fiber optic fusion splicers in wide commercial deployment have not had the functionality to terminate an optical fiber with a spliced-on fiber optic connector. More specifically, fiber optic fusion splicers have been unable to splice on a fiber optic connector that incorporates the splice point within the body of the fiber optic connector. As a result, an installer who wished to connect FTTP service at the ONT by cutting the feeder fiber optic cable to length and directly terminating the feeder fiber optic cable with a splice-on fiber optic connector was unable to do so.

A fiber optic fusion splicer specifically configured to use a specially designed fiber optic connector that incorporates the splice point in the body of the connector has been proposed. However, this forces an installer to buy new fusion splicing equipment. Additionally, this technical approach requires an installer to buy a connector that is specifically designed for one method of termination—splicing the connector onto the optical fiber cable using a specially configured splicer. Thus, an installer is unable to use industry standard connectors and industry standard fiber optic fusion splicers.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

It is an object of the invention to provide a spliced-on connector system which is compatible with a variety of connector and cable types, and maintains the optical integrity of the system, minimizing both attenuation and back reflections of the system.

It is a further object of the invention to provide a spliced-on connector system which will enable customers to use their existing splicer fleet to install connectors, eliminate the need for fiber management within the ONT or skill routing the fibers within the ONT, and allow the use of inexpensive bulk reels of cable instead of the use of expensive pre-terminated cables.

It is a further object of the invention to provide a spliced-on connector system in which the splice point is protected by an extender tube which covers the splice point sleeve and attaches onto the back of industry standard connectors.

Another object of the invention is to provide a connector holder which allows the existing base of fiber optic fusion splicers to be configured to splice on a connector to an optical fiber without modification to the base fusion splicer unit.

According to an object of the present invention, there is provided a spliced-on connector system including: a connector body; an incoming fiber which is spliced to the connector body; a splice sleeve which covers a splice point at which the incoming fiber is spliced to the connector body; and an extender tube which covers the splice sleeve.

The extender tube may be attached to the connector body.

The extender body may restrict torsion and bending of the splice sleeve.

The connector body may include a short section of fiber which is spliced to the incoming fiber.

The splice sleeve may be heat-shrunk to fit tightly around the incoming fiber, the short section of fiber, and the splice point.

The short section of fiber may be glued to a connector portion of the connector body.

The spliced-on connector system may further include a relief boot which is crimped or pressed to an end portion of the extender tube which covers the incoming fiber.

The relief boot may restrict motion of the incoming fiber with respect to the extender tube.

The extender tube may be one of press-fit, interference-fit, and crimped, and thread onto the connector body.

According to another object of the present invention, there is provided a method of producing a spliced-on connector system including: splicing an incoming fiber to a connector body; covering, with a splice sleeve, a splice point at which the splicing is performed; and covering the splice sleeve with an extender tube.

The method may further include attaching the extender tube to the connector body.

The attaching may include one of press-fitting, interference-fitting, crimping, and threading the extender tube to the connector body.

The method may further include: before the covering the splice sleeve with the extender tube, heat-shrinking the splice sleeve over the splice point, the incoming fiber, and a short section of fiber of the connector body.

The method may further include: attaching the extender tube to the connector body.

The method may further include: crimping, pressing, or threading a Kevlar strength member retention sleeve onto fiber end portion of the extender tube which covers the incoming fiber. A strain relief boot may be attached to the fiber end of the extender tube directly or over the Kevlar strength member retention sleeve.

The method may further include: before the splicing, sliding the splice sleeve over a jacket.

The method may further include: crimping or pressing a relief boot to a fiber end portion of the extender tube which covers the incoming fiber, wherein Kevlar fibers of the jacket are arranged over the extender tube, and wherein the crimping or pressing includes crimping or pressing the relief boot over the jacket.

An inner diameter of the splice sleeve may be greater than an outer diameter of the jacket.

According to another object of the present invention, there is provided a holder for accommodating a connector body, the holder including a depression which holds the connector body in a position in which the connector body is spliced to an incoming fiber, the holder being disposed inside a splicer which splices the connector body to the incoming fiber.

The holder may be adapted to fit into at least two different models of splicers.

The holder may further include pin guide holes which are compatible with the at least two different models of splicers.

According to still another object of the present invention, there is provided a splicer for splicing a cable to a connector including: a tube heater which heat-shrinks a splice sleeve over a splice point at which a connector body is spliced to an incoming fiber, wherein the tube heater accommodates a connector holder which holds the connector body.

The tube heater may accommodate a clamp which holds the incoming fiber.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
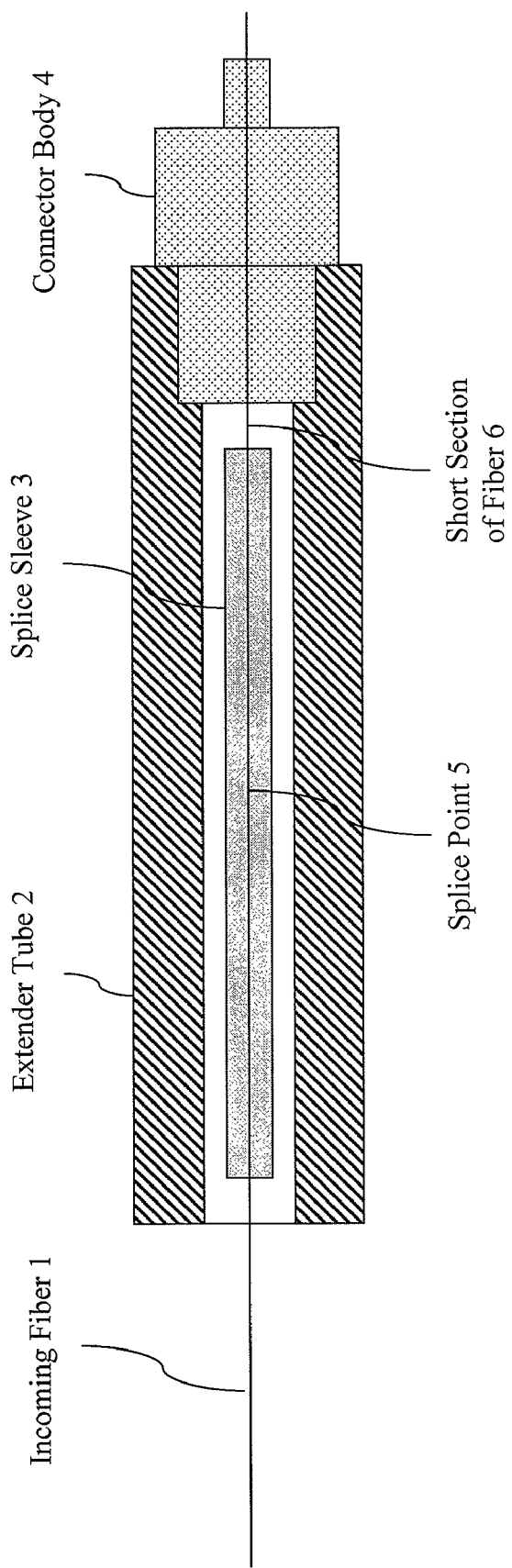
FIG. 1 illustrates a spliced-on connector system according to an exemplary embodiment of the present invention.

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

FIG. 1 illustrates a spliced-on connector system according to an exemplary embodiment of the present invention.

As shown in FIG. 1 the spliced-on connector system according to an exemplary embodiment of the present invention includes an incoming fiber 1, an extender tube 2, a splice sleeve 3, a connector body 4, a splice point 5, and a short section of fiber 6.

The incoming fiber 1 is spliced to a short section of fiber 6 of the connector body 4. The short section of fiber 6 may be glued to the connector body 4.

The splice point 5 is the area at which the incoming fiber 1 is spliced to the short section of fiber 6. The splice sleeve 3 covers the splice point 5. In particular, the splice sleeve 3 may be heat-shrunk to tightly cover the splice point 5, incoming fiber 1, and the short section of fiber 6.

The extender tube 2 covers the splice sleeve 3 to restrict torsion and bending thereof The extender tube 2 may also prevent mechanical damage to the splice sleeve 3. Additionally, the extender tube 2 may be attached to the connector body 4 by one of press-fitting, interference-fitting, crimping, and threading the extender tube 2 to the connector body 4.

Figure 2:
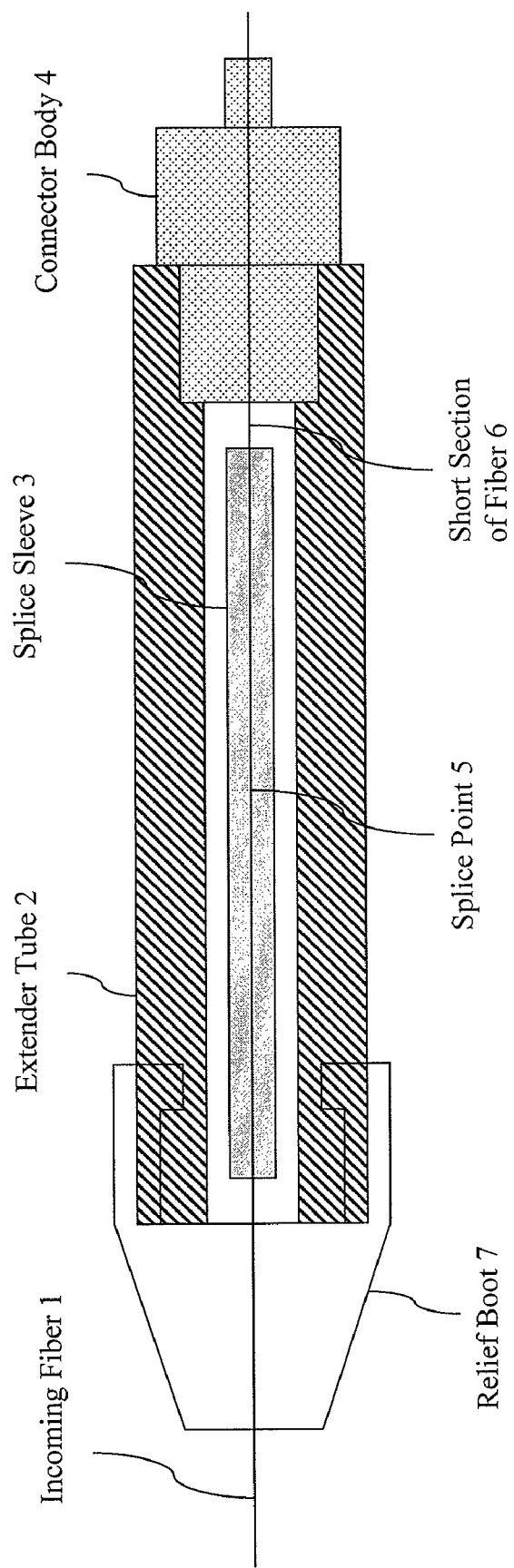
FIG. 2 illustrates a spliced-on connector system according to another exemplary embodiment of the present invention.

Next, a spliced-on connector system according to another exemplary embodiment of the present invention will be described. FIG. 2 illustrates a spliced-on connector system according to the another exemplary embodiment of the present invention. Note that like elements are identified with like numerals, and thus overlapping description is omitted.

Figure 3:
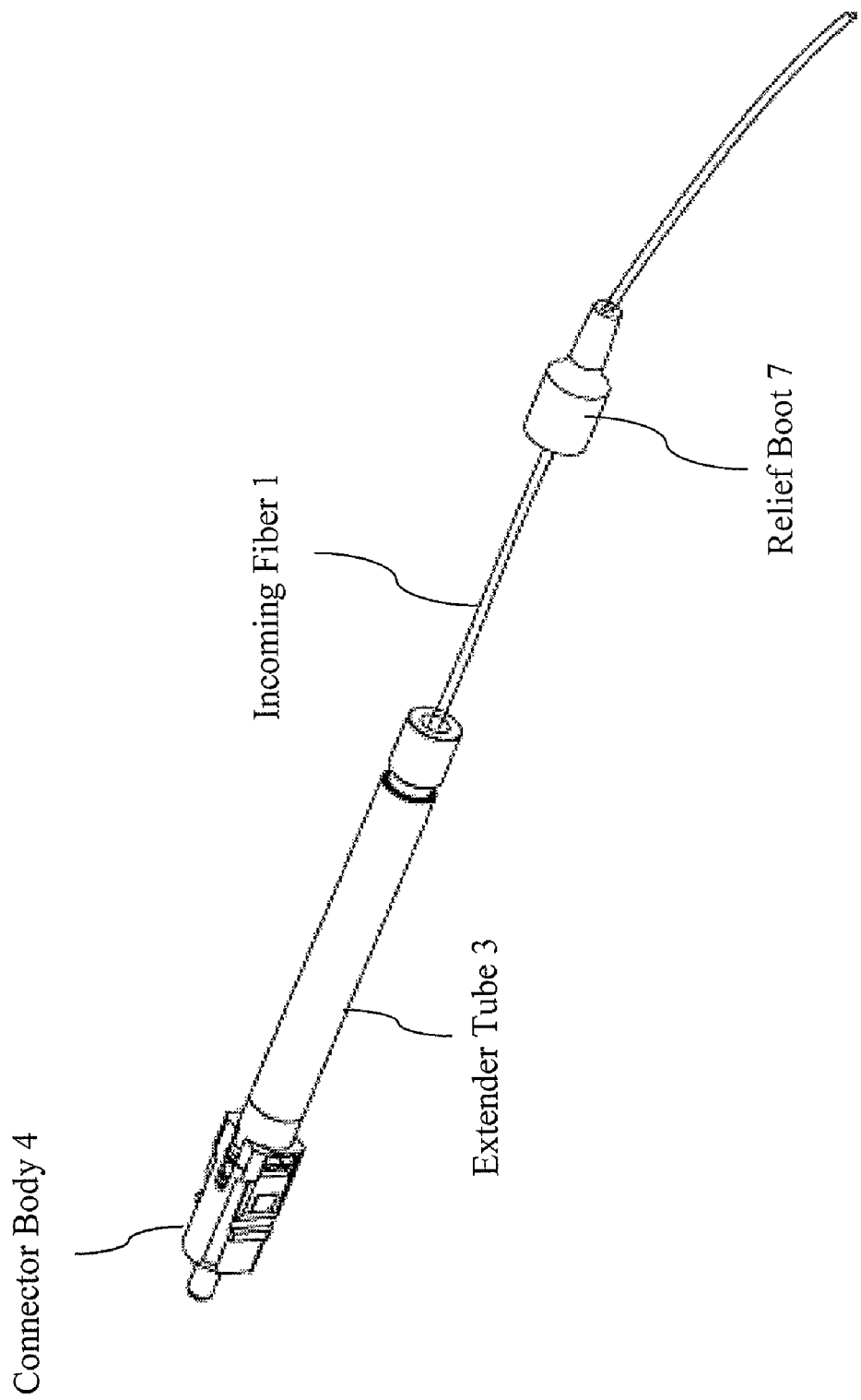
FIG. 3 is a perspective view illustrating the spliced-on connector system of FIG. 2.

As shown in FIG. 2, a relief boot 7 is crimped or pressed to an end of the extender tube 2 which covers the incoming fiber 1 and is opposite the connector body 4. The relief boot 7 restricts motion of the incoming fiber 1 with respect to the extender tube 2. FIG. 3 is a perspective view illustrating the spliced-on connector system of FIG. 2 before the relief boot 7 is crimped or pressed to the extender tube.

Figure 4:
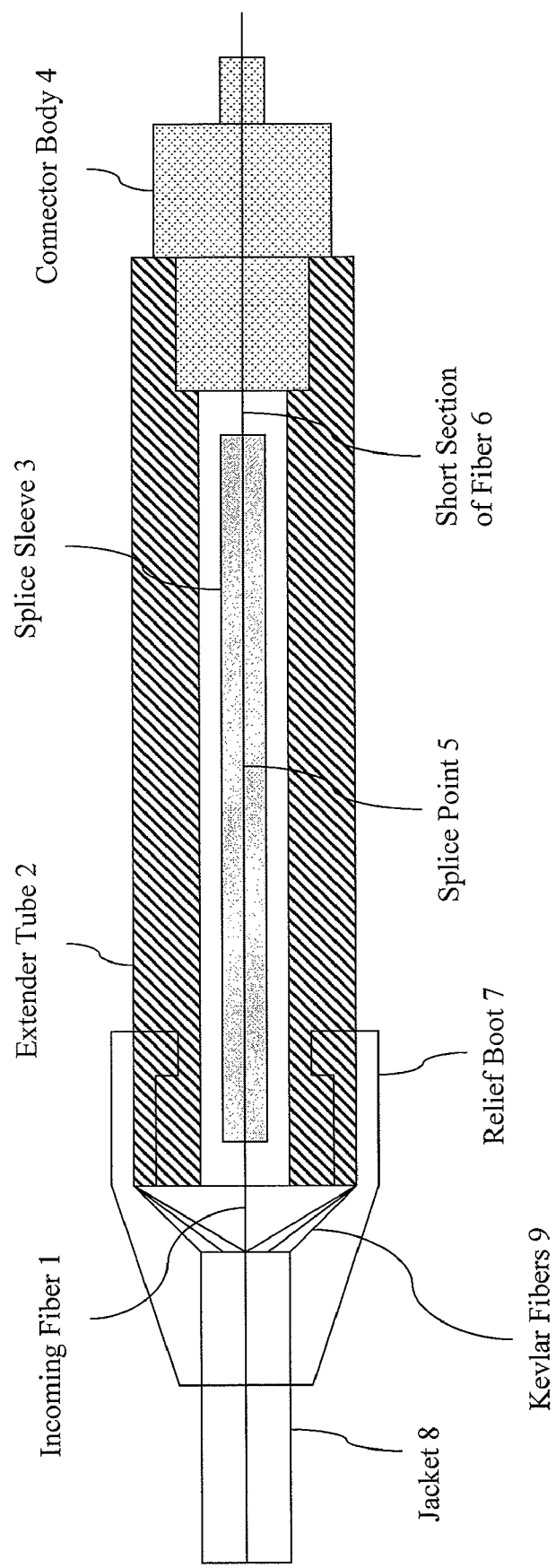
FIG. 4 illustrates a spliced-on connector system according to another exemplary embodiment of the present invention.

Next, a spliced-on connector system according to still another exemplary embodiment of the present invention will be described. FIG. 4 illustrates a spliced-on connector system according to the still another exemplary embodiment of the present invention.

As shown in FIG. 4, portions of the incoming fiber 1 not covered by the extender tube 2 are protected by a jacket 8. The jacket 8 may be made of Kevlar. Additionally, Kevlar fibers 9 extending from the jacket 8 are crimped or pressed over the extender tube 2 by the relief boot 7. Thus, the splice point 5 may be further protected, as the extender tube 2 will absorb any pulling force on the jacket 8 via the Kevlar fibers 9.

Figure 5:
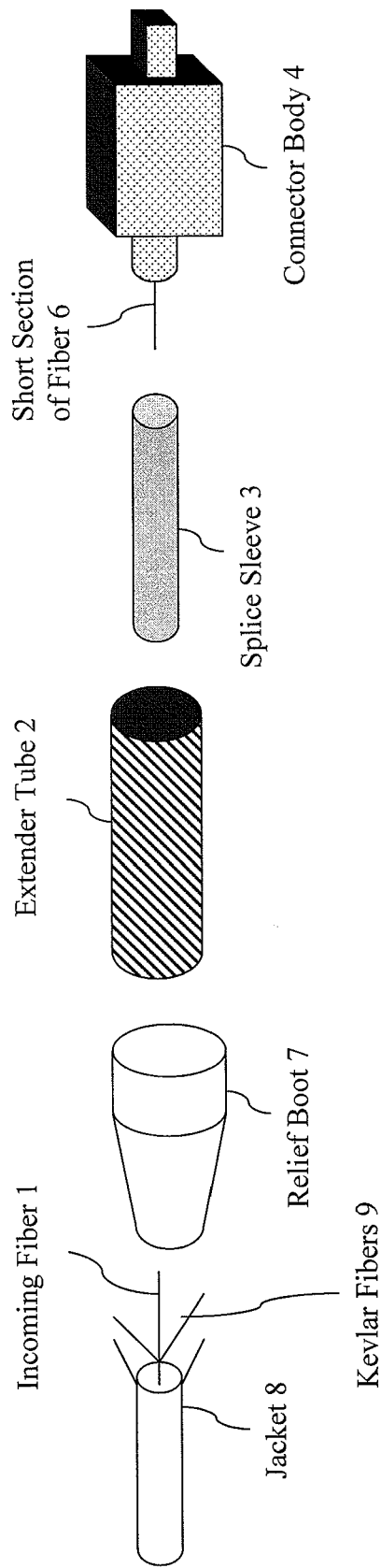
FIG. 5 and FIG. 6 are perspective views illustrating the individual components of the pre-assembled spliced-on connector systems of FIG. 1 to FIG. 4.
Figure 6:
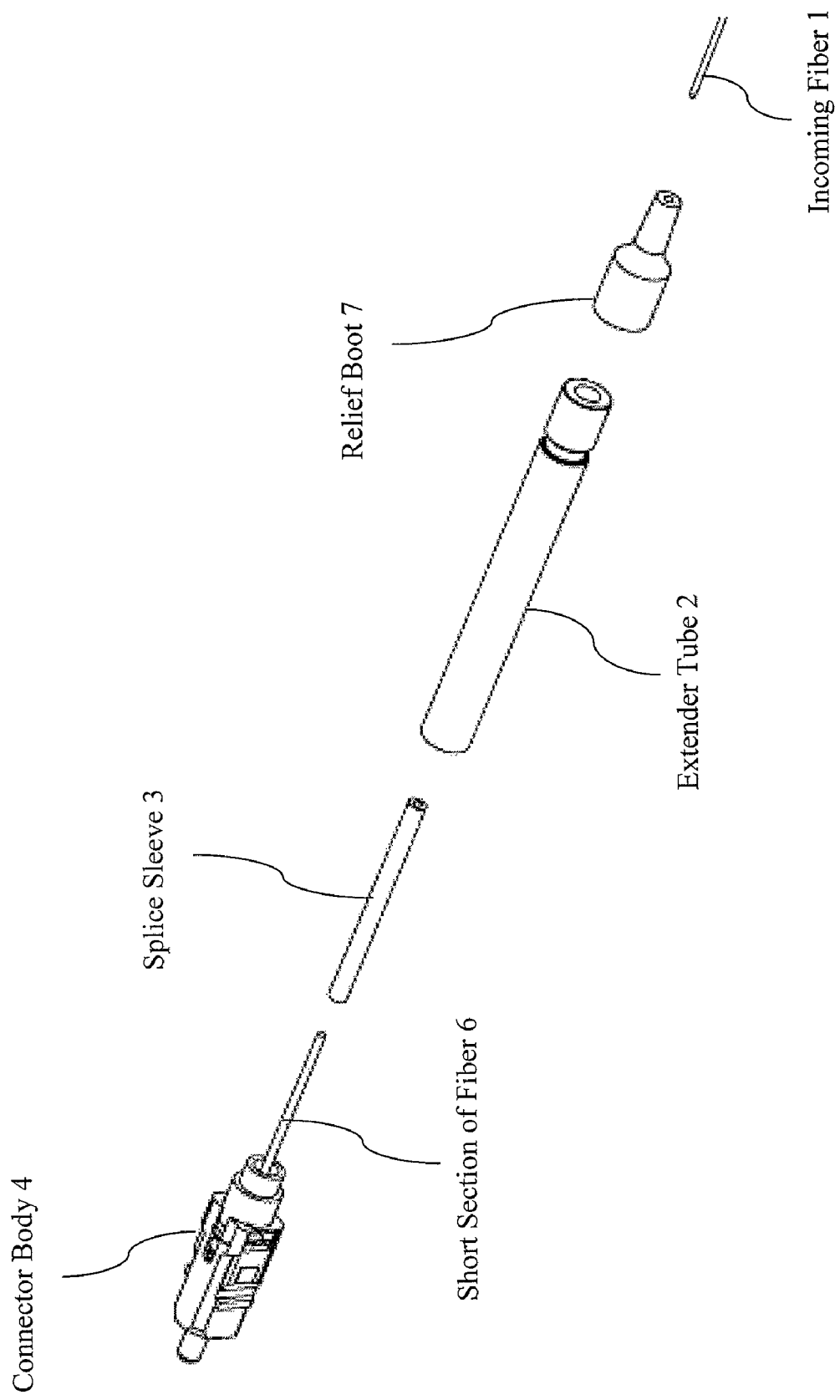

FIG. 5 and FIG. 6 are perspective views illustrating the individual components of the pre-assembled spliced-on connector systems of FIG. 1 to FIG. 4.

Next, a method of producing a spliced-on connector system according to an exemplary embodiment of the present invention will be described.

Figure 7:
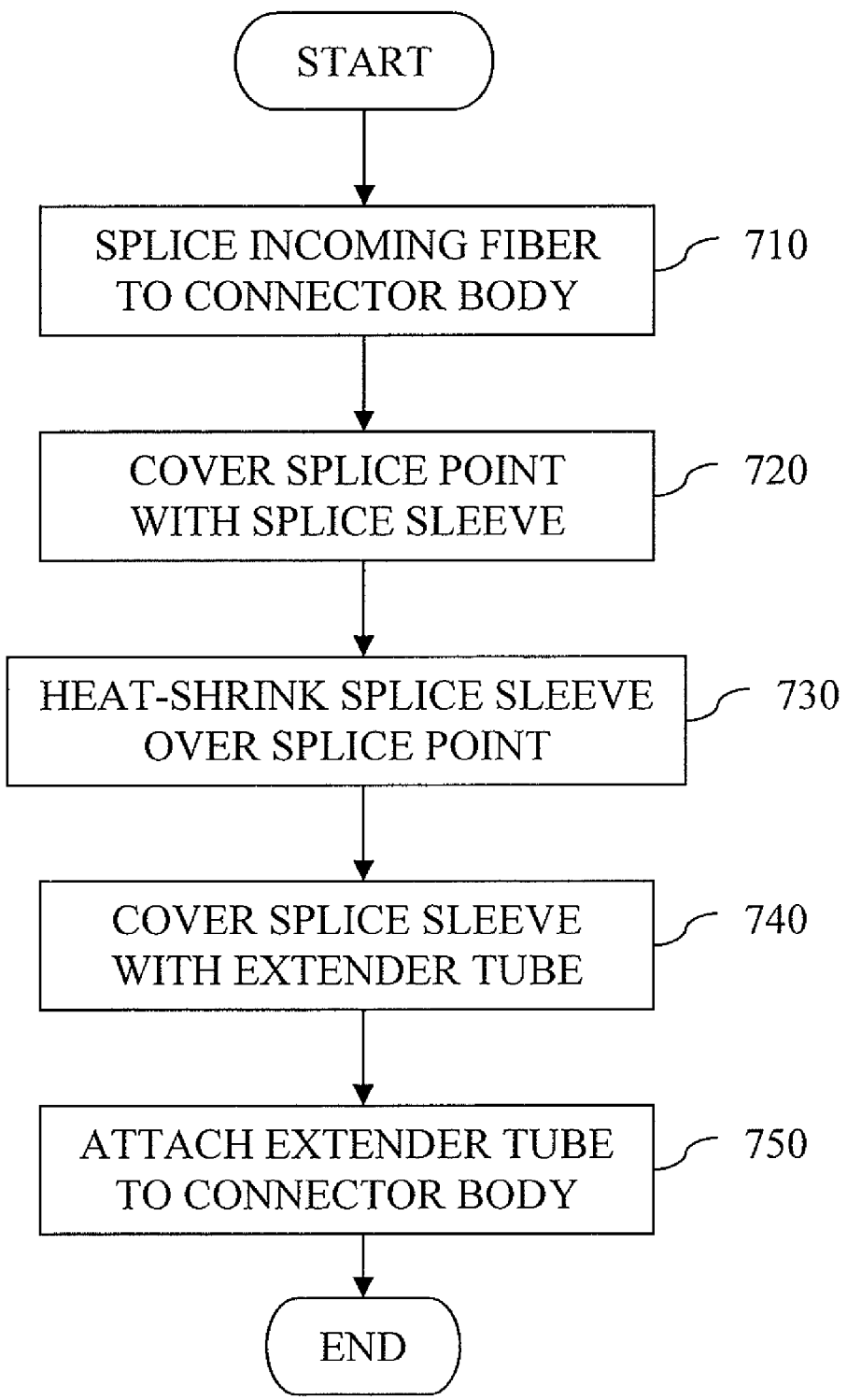
FIG. 7 is a flowchart illustrating a method of producing a spliced-on connector system according to an exemplary embodiment of the present invention.

FIG. 7 is a flowchart illustrating a method of producing a spliced-on connector system according to an exemplary embodiment of the present invention.

Figure 10:
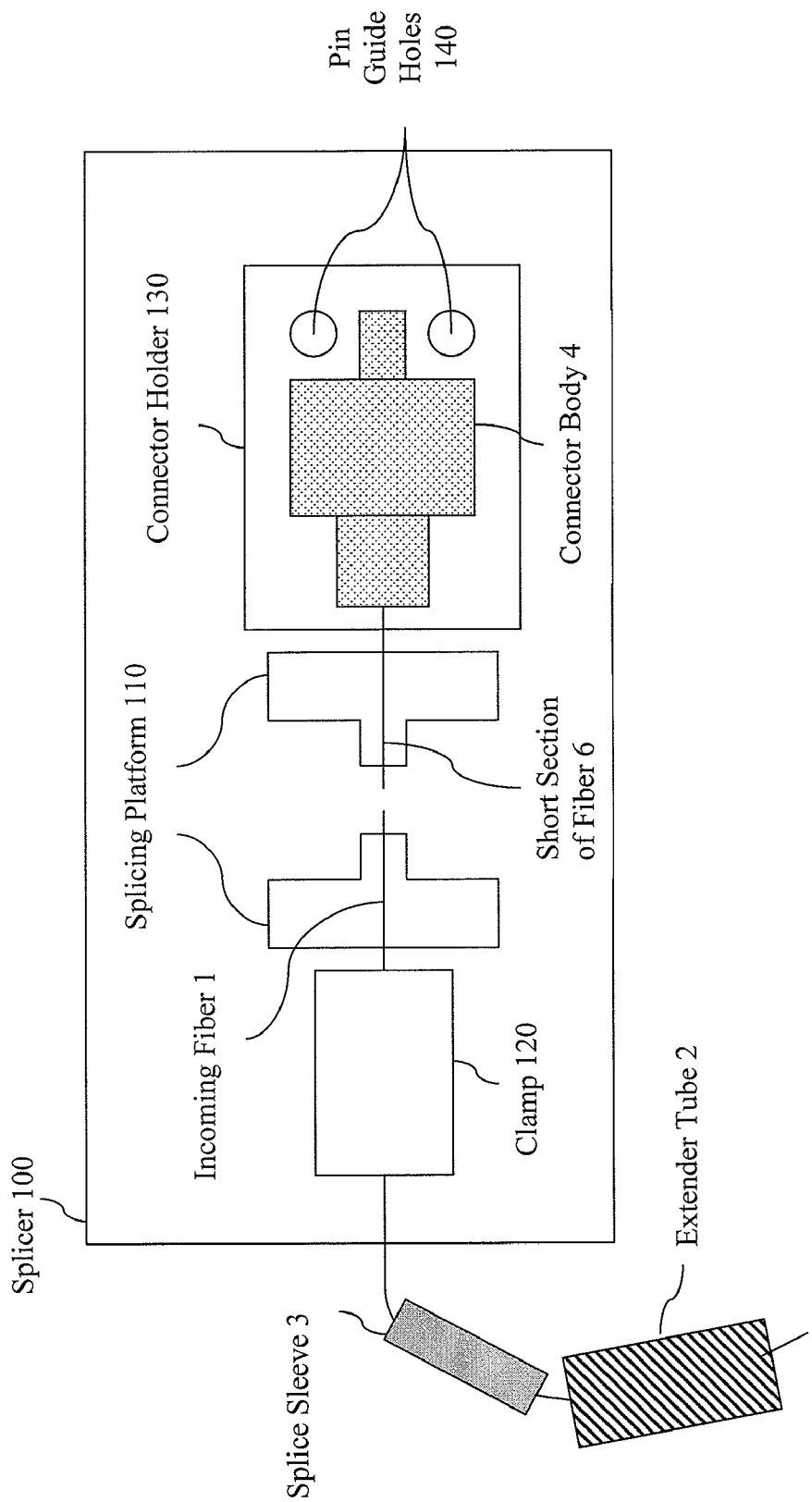
FIG. 10 illustrates a spliced-on connector system in a splicing configuration according to an exemplary embodiment of the present invention.

First, the incoming fiber 1 is spliced to the short section of fiber 6 of the connector body 4 in operation 710. FIG. 10 illustrates a spliced-on connector system in a splicing configuration according to this exemplary embodiment of the present invention. As shown in FIG. 10, the incoming fiber 1 and the short section of fiber 6 are each set on a splicing platform 110 of a splicer 100. A connector holder 130, disposed inside of the splicer 100, stabilizes the connector body 4 in a position in which the short section of fiber 6 may be spliced with the incoming fiber 1.

Figure 11A:
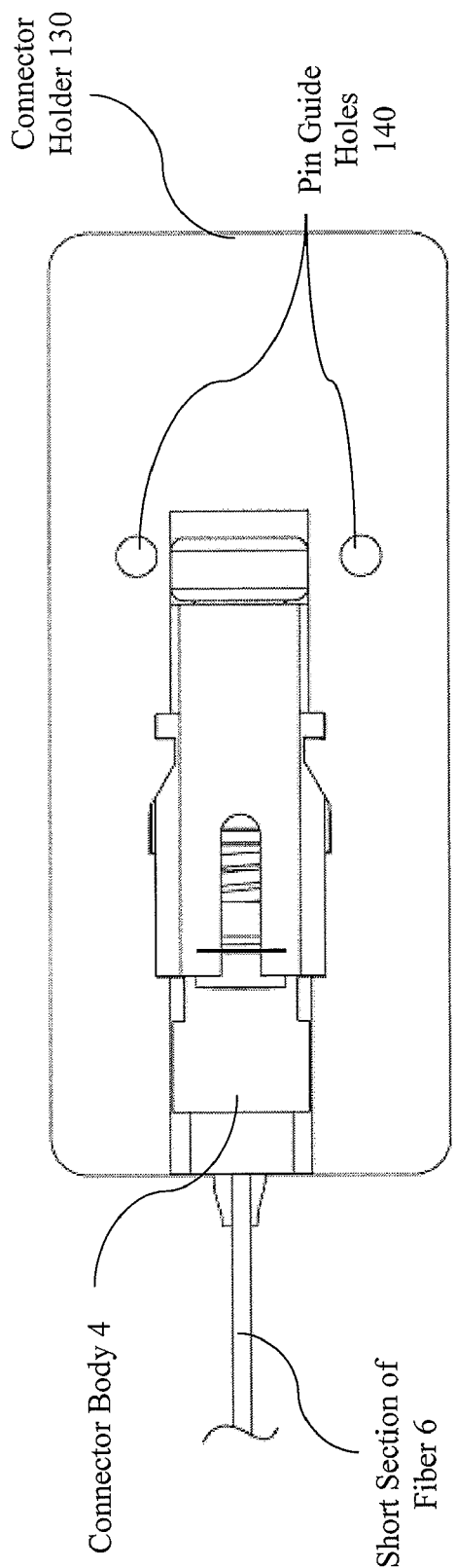
FIG. 11A illustrates a connector holder according to an exemplary embodiment of the present invention.
Figure 11B:
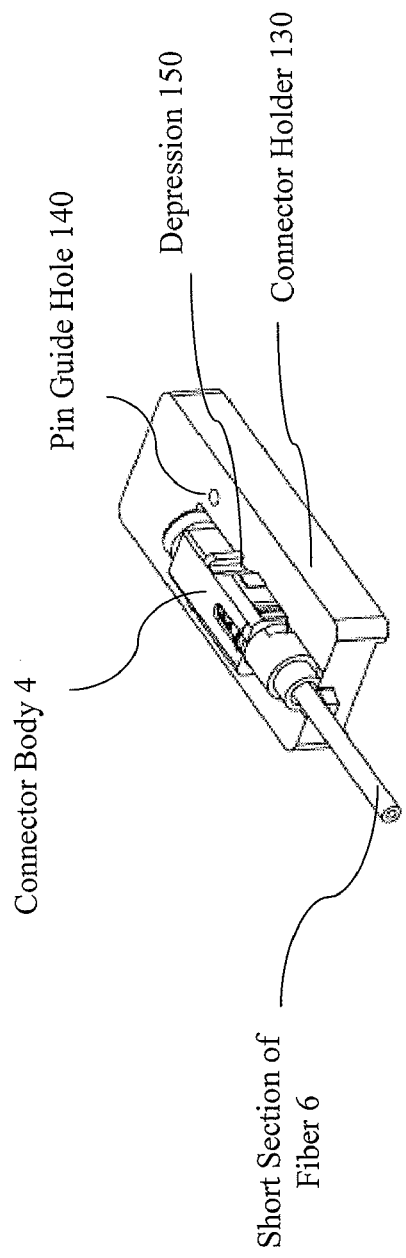
FIG. 11B is a perspective view illustrating the connector holder of FIG. 11A.

The connector holder 130 includes two pin hole guides 140 and is adapted to fit into at least two models of splicers. Thus, no modification is required of the splicer 100 in order to splice a connector to a fiber. As shown in FIG. 11A and FIG. 11B, the connector holder 130 includes a depression 150 in which the connector body 4 is disposed. As a result, the connector body 4 is positioned in the splicer 100 at the proper height to be spliced to incoming fiber 1. This positioning facilitates low-loss splicing. Additionally, the connector holder 130 is able to occupy the foot-print of a variety of conventional splicers. Thus, the connector holder 130 allows a user to splice on a connector without modification to the splicer 100.

A clamp 120 holds the incoming fiber 1 in a position in which it may be spliced. The splice sleeve 3 and the extender tube 2 are arranged on the incoming fiber 1, outside of the splicer 100. However, the splice sleeve 3 may be disposed inside the splicer 100. If the splice sleeve 3 is disposed inside the splicer 100, it may be necessary to reduce the length of the clamp 120.

Figure 12:
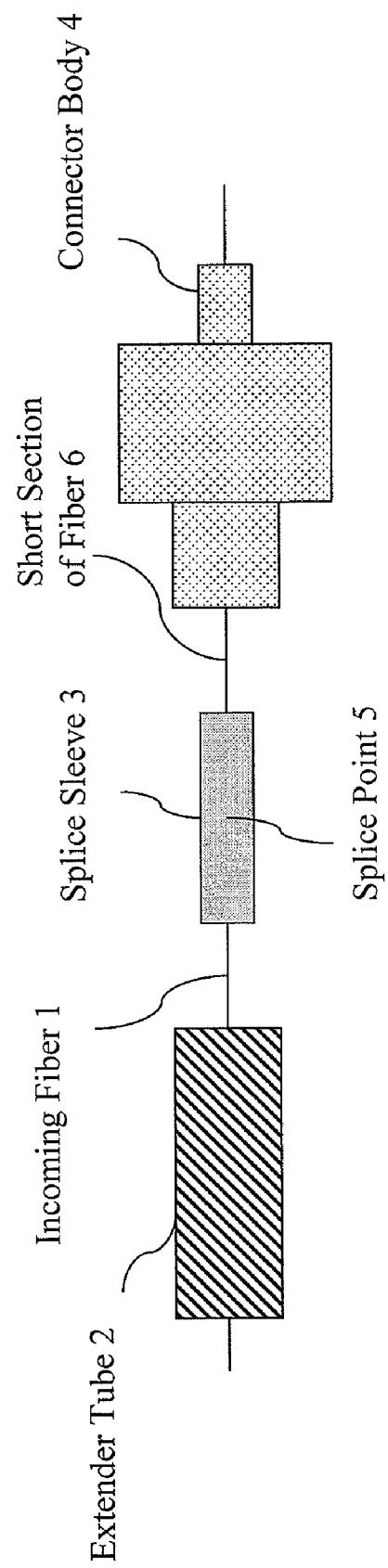
FIG. 12 illustrates the spliced-on connector system of FIG. 10 in a post-splice configuration.

After the splicing is performed, the clamp 120 is removed and the splice point 5 is covered with the splice sleeve 3, in operation 720. FIG. 12 illustrates the spliced-on connector system in this configuration in which the splice sleeve 3 covers the splice point 5.

Figure 13:
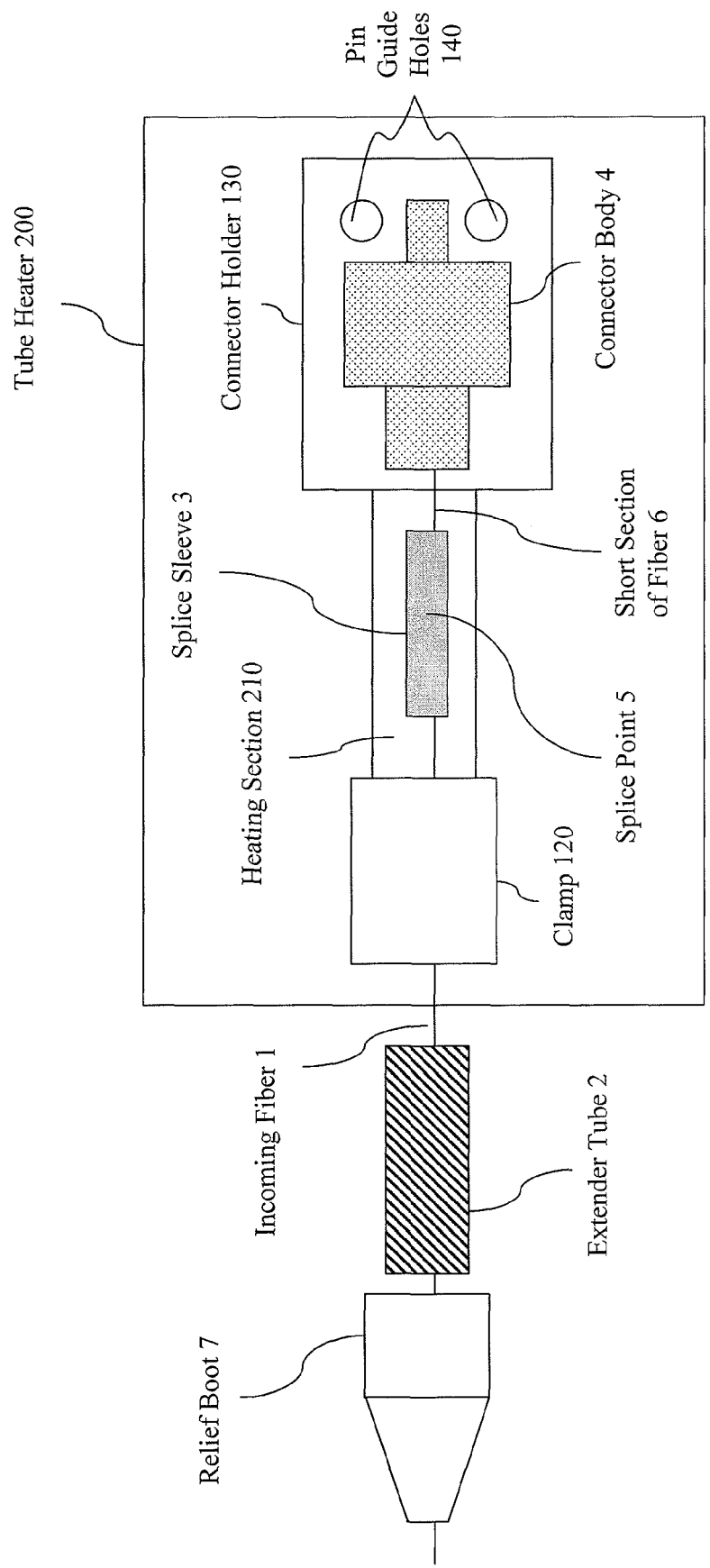
FIG. 13 illustrates the spliced-on connector system of FIG. 10 installed in a tube heater.

In operation 730, the splice sleeve 3 is heat-shrunk to fit tightly over the incoming fiber 1, the splice point 5, and the short section of fiber 6. In order to perform the heat-shrinking, the splice sleeve 3 which is covering the splice point 5 is inserted into a heating section 210 of a tube heater 200. The tube heater may be disposed in the splicer 100. FIG. 13 shows the spliced-on connector system installed in tube heater 200 according to the exemplary embodiment of the present invention. The tube heater 200 also accommodates the connector holder 130 which holds the connector body 4 in a position, with respect to the tube heater 200, such that the splice sleeve 3 is properly positioned in the heating section 210.

As shown in FIG. 13, the tube heater 200 may accommodate the clamp 120 which may be clamped over the incoming fiber 1 to provide further stability of the splice sleeve 3.

After the heat-shrinking, the splice sleeve 3 is covered with the extender tube 2 to achieve the configuration shown in FIG. 1 (operation 740).

Finally, the extender tube 2 is attached to the connector body 4 by one of press-fitting, interference-fitting, crimping, and threading the extender tube 2 to the connector body 4 (operation 750).

Figure 8:
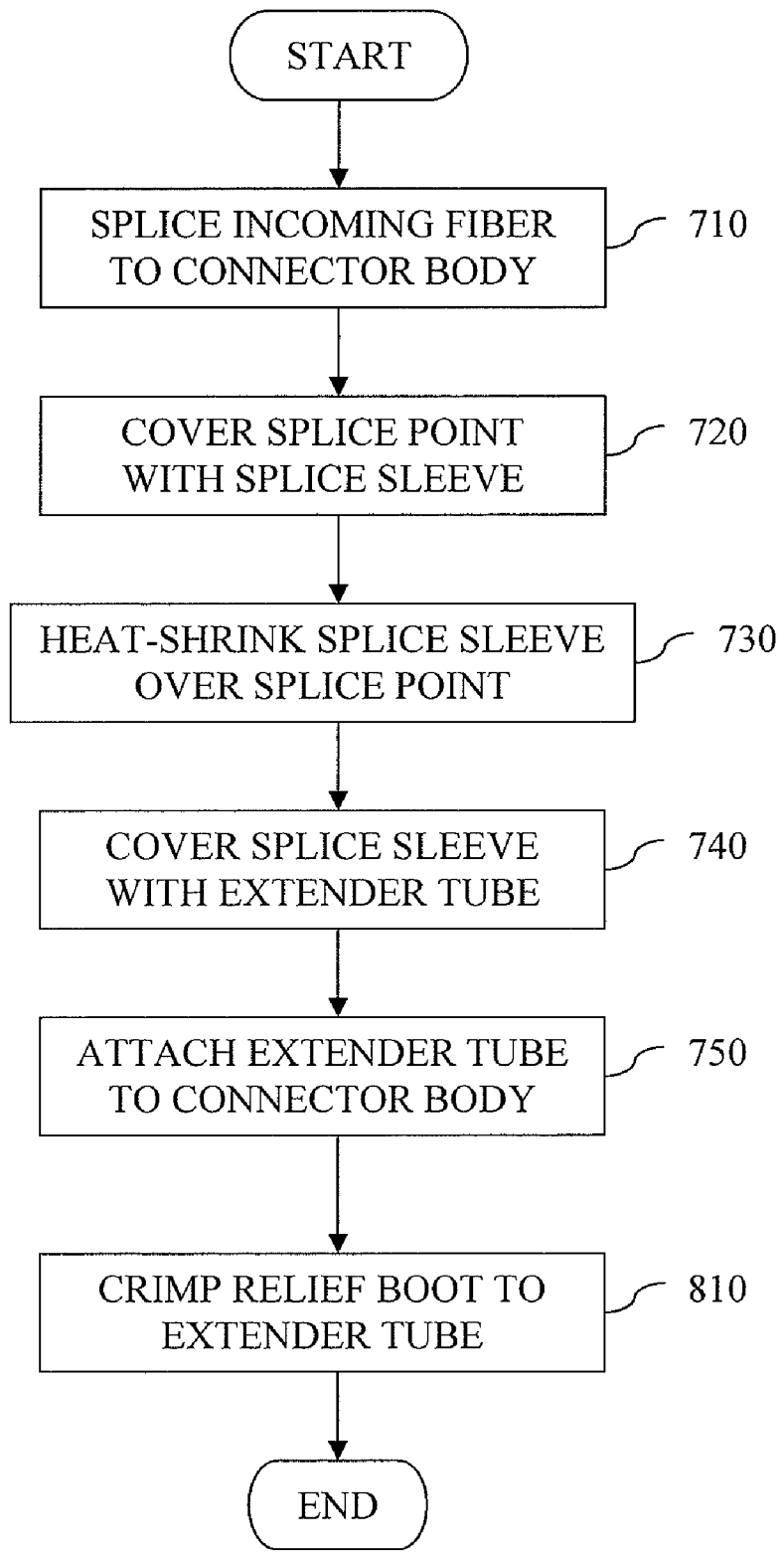
FIG. 8 is a flowchart illustrating a method of producing a spliced-on connector system according to another exemplary embodiment of the present invention.

FIG. 8 is a flowchart illustrating a method of producing a spliced-on connector system according to another exemplary embodiment of the present invention. In addition to the operations enumerated in FIG. 7, the relief boot 7 may be crimped or pressed to an end portion of the extender tube 2 which covers the incoming fiber 1 and is opposite the connector body 4 (operation 810). The relief boot 7 serves to restrict motion of the incoming fiber 1 with respect to the extender tube 2. With the crimping or pressing of the relief boot 7, the configuration shown in FIG. 2 of the another exemplary embodiment of the present invention is achieved.

Figure 9:
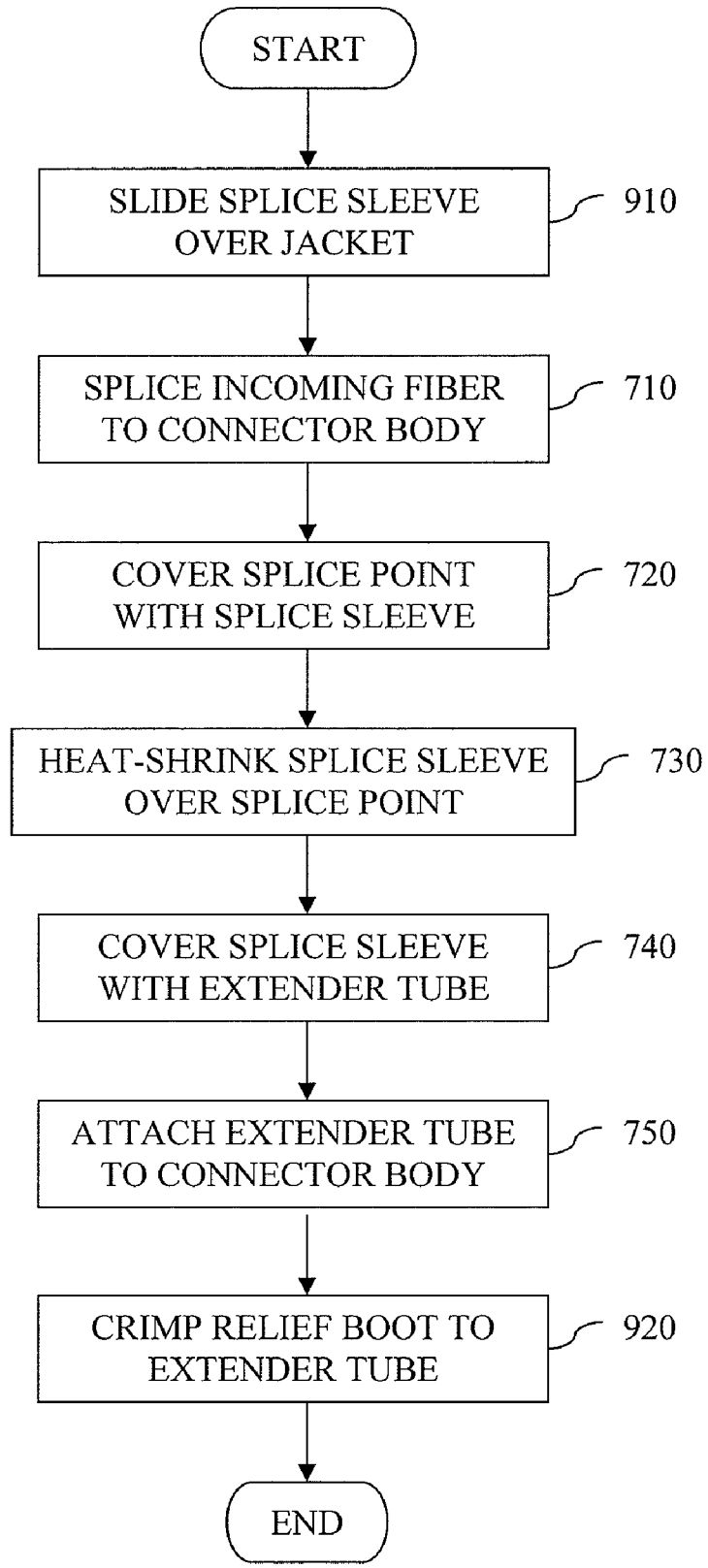
FIG. 9 is a flowchart illustrating a method of producing a spliced-on connector system according to still another exemplary embodiment of the present invention.
Figure 14:
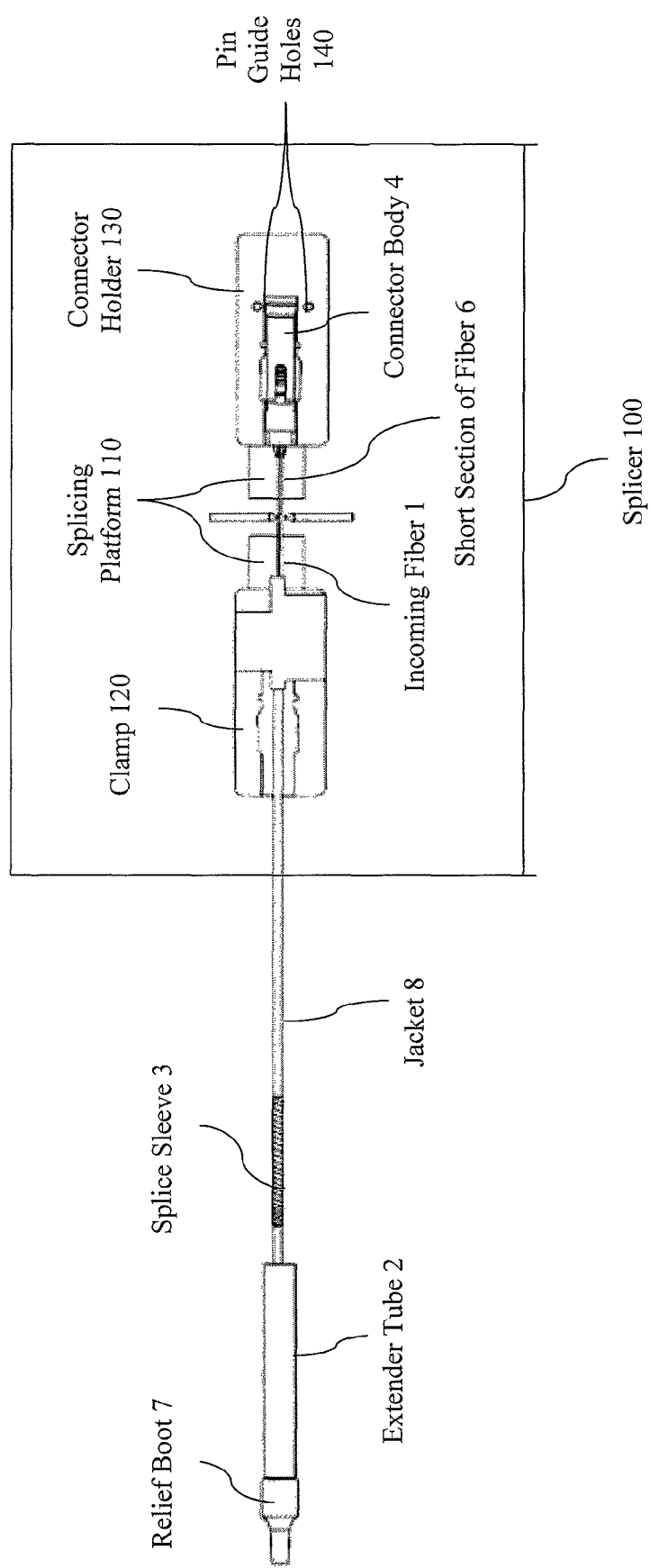
FIG. 14 illustrates a spliced-on connector system in a splicing configuration according to another exemplary embodiment of the present invention.

FIG. 9 is a flowchart illustrating a method of producing a spliced-on connector system according to still another exemplary embodiment of the present invention. As shown in FIG. 9, before the splicing is performed, the splice sleeve 3 is slid over a jacket 8 which covers the incoming fiber 1 (operation 910). FIG. 14 illustrates the spliced-on connector system in a splicing configuration in which jacket 8 serves as a protective layer to the incoming fiber 1 according to the still another exemplary embodiment of the present invention.

As shown in FIG. 14, the splice sleeve 3 is slid over the jacket 8. Thus, an inner diameter of the splice sleeve 3 must be larger than an outer diameter of the jacket 8.

Figure 15:
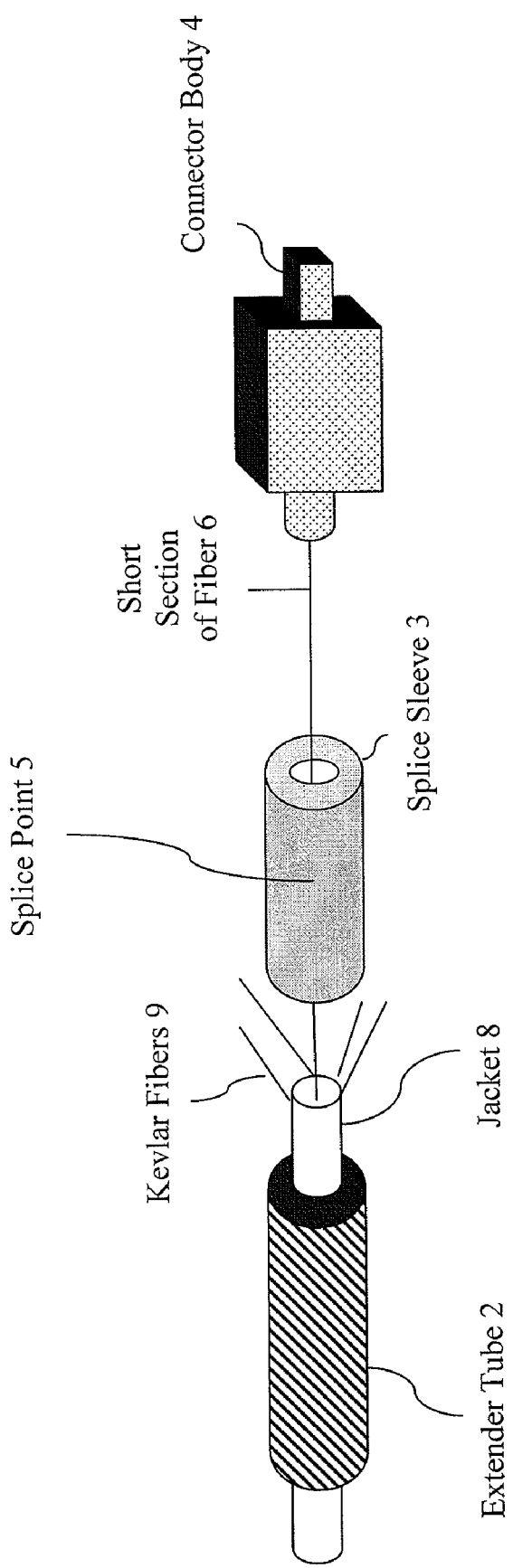
FIG. 15 is a perspective view illustrating the spliced-on connector system of FIG. 14 in a post-splice configuration.
Figure 16:
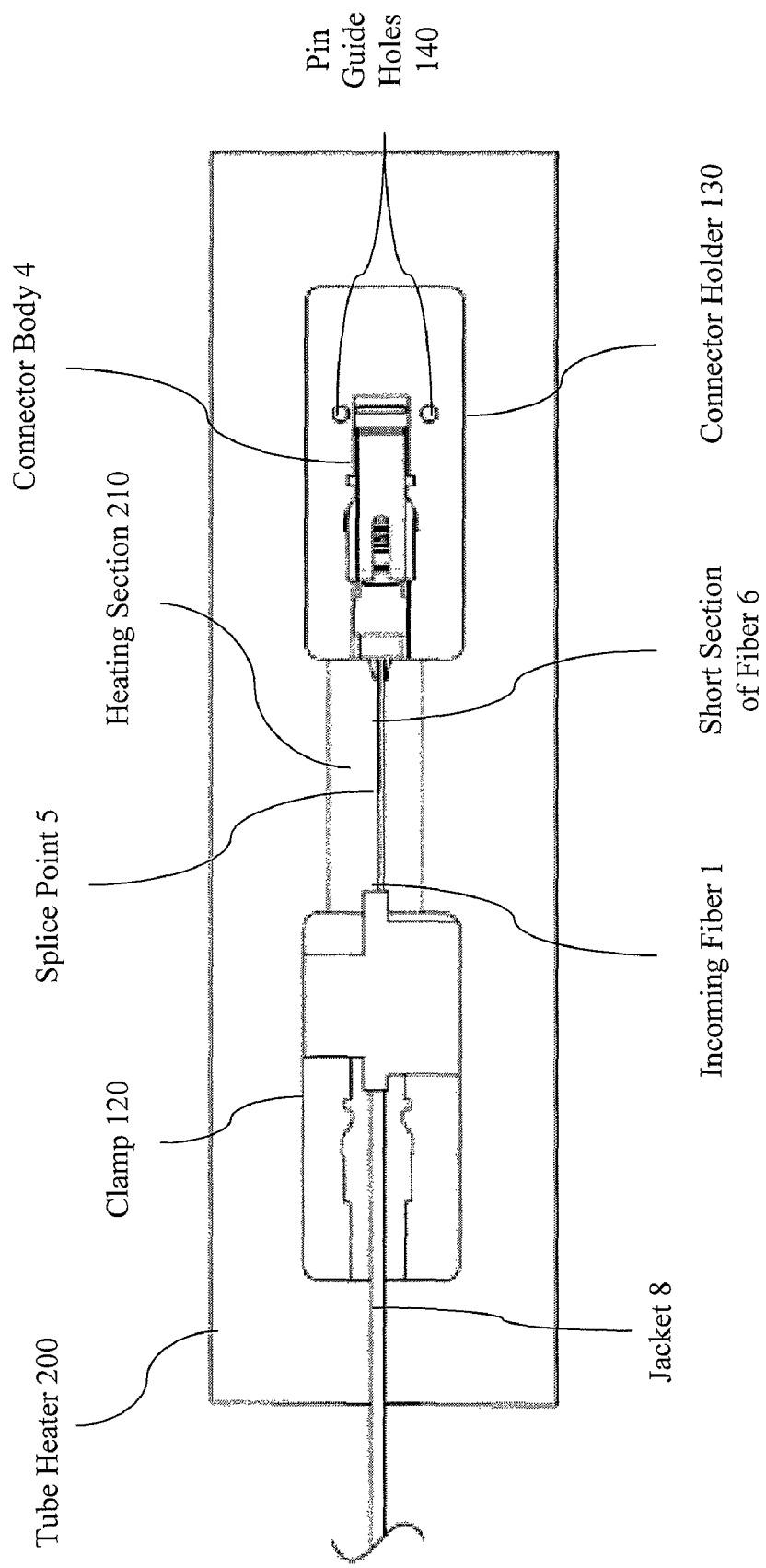
FIG. 16 illustrates the spliced-on connector system of FIG. 14 installed in a tube heater.

FIG. 15 is a perspective view which illustrates the spliced-on connector system of FIG. 14 in a post-splice configuration. As shown in FIG. 15, the splice sleeve 3 has an inner diameter that is larger than the outer diameter of the jacket 8.

Figure 17:
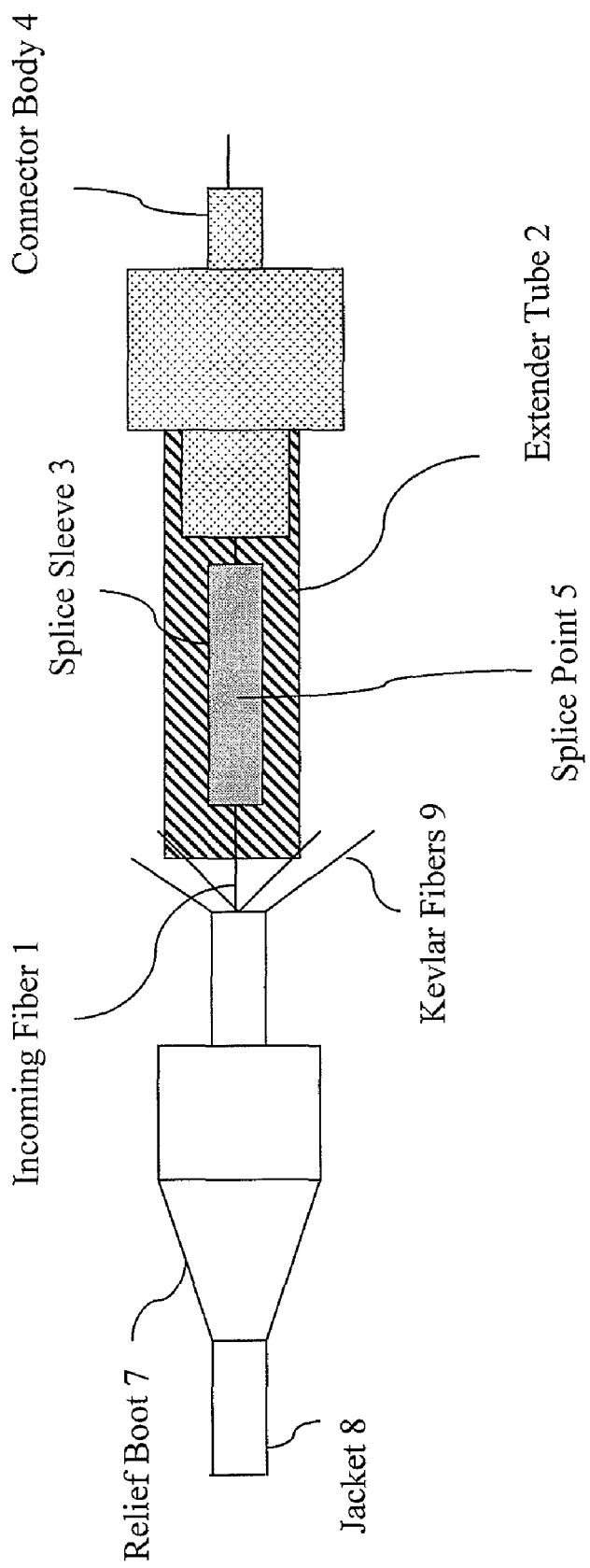
FIG. 17 illustrates the spliced-on connector system of FIG. 14 after removal from the tube heater.

Similar to the previously described exemplary embodiments of the present invention, after the splicing, the splice sleeve 3 covers the splice point 5 (operation 720). Also similar to the previously described exemplary embodiments of the present invention, the splice sleeve 3 is heat-shrunk over the splice point 5 using tube heater 200 (operation 730) as shown in FIG. 13 and the extender tube 2 is slid over the splice sleeve 3 (operation 740) as shown in FIG. 17. However, according to the still another exemplary embodiment of the present invention, when the extender tube 2 is slid past the jacket 8, the Kevlar fibers 9 extend over the extender tube 2. Thus, when the relief boot 7 is crimped or pressed to the extender tube 2 (operation 920), the Kevlar fibers 9 are crimped or pressed over the extender tube 2 by the relief boot 7 to achieve the configuration shown in FIG. 4. Thus, the splice point 5 may be further protected, as the extender tube 2 will absorb any pulling force on the jacket 8 via the Kevlar fibers 9.

Additionally, a Kevlar strength member retention sleeve may be crimped, pressed, or thread onto the extender tube 2, and the relief boot 7 may be crimped or pressed to the extender tube over the Kevlar strength member retention sleeve.

Example 1

The following is one example of the specifications and method for producing a spliced-on connector system according to an exemplary embodiment of the present invention:

Fusion-Installable Connector System (FICS)
SC/APC and SC/UPC for 250 um and 900 um jacketed fiber (FICS Basic)

1. FICS connector variants
a. Single fiber connectors
a. 1 SC/APC
a. 2 SC/UPC
2. FICS connector dimensional and intermaleability requirements
a. FICS SC/UPC and SC/APC connectors shall meet the dimensional reqiuirements of TIA/EIA-804-S
(FOCIS-3) Fiber Optic Intermaleability Standard
3. Cordage Requirements
a. SC/UPC and SC/APC FICS connector designs must be able to terminate the following cordage types
a. 1 250 um coated optical fiber (Media Type III per GR-326-CORE issue 3)
a. 2 900 um tight buffered fiber (Media Type II per GR-326-CORE issue 3)
4. FICS connectors shall meet the following optical performance requirements
a. FICS SC/UPC and SC/APC connectors

| | |
|---|---|
| a. 1 New Product | Maximum Loss = 0.40 dB and Mean Loss = 0.20 dB |
| | Minimum Reflectance = −55 dB (SC/UPC) and −60 dB (SC/APC) |
| a. 2 During Test, Not Under Test | Maximum Loss = 0.50 dB, Mean Loss = 0.30 dB, Loss Increase = 0.30 dB |
| | Minimum Reflectance = −55 dB (SC/UPC) and −60 dB (SC/APC) |
| | Reflectance increase = 5 dB |
| a. 3 During Test, Under Load | Loss Increase = 0.50 dB |
| | Reflectance Increase = 5 dB |
| a. 4 End of Test | Maximum Loss = 0.50 dB and Mean Loss = 0.30 dB |
| | Minimum Reflectance = −55 dB (SC/UPC) and −60 dB (SC/APC) |

5. The endface geometry the FICS connector must be compliant to GR-326-CORE issue 3 section 4.4.5
6. Operating Temperature and Humidity = −40 C. to 85 C. and 0-90% RH
7. Storage Temperature and Humidity = −40 C. to 85 C. and 0-90% RH
8. The FICS SC/UPC and SC/APC connector must be compliant to all GR-326-CORE issue 3 requirements except as noted below:
a. Flex Test (GR-326-CORE issue 3 section 4.4.3.2)
a. 1 Reduce tensile to 1 lbf.
b. Twist Test (GR-326-CORE issue 3 section 4.4.3.3)
b. 1 Reduce load in section 4.4.3.3.c as follows:
    Media Type II, 0.5 lbf
    Media Type III, 0.5 lbf
b. 2 Reduce capstan rotations per Table 4-8 as follows
    Media Type          X          Y
    Type II and III       1.5        3
c. Proof Test (GR-326-CORE issue 3 section 4.4.3.4)
c. 1 Reduce straight pull tensile load to 5 lbf and 7.5 lbf respectively.
c. 2 Reduce side pull tensile load to 1.5 lbf and 3 lbf respectively.
d. Transmission with Applied Tensile Load (GR-326-CORE issue 3 section 4.4.3.5)
d. 1 Reduce the transmission with applied tensile load per Table 4-9 as follows:
    Media Type II and III
    0.5 lbf               X          X
e. Connector Installation (GR-326-CORE issue 3 section 4.4.6)
e. 1 The maximum connector length shall be 50 mm (ferruel tip to boot)
9. The FICS connector splice is compatible with at least the following splicer models:
        FSM-50R12 (Mass fusion splicer for splicing up to 12 fibers)
        FSM-17R (Mass fusion splicer for splicing up to 4 fibers)
        FSM-17S-FH (Single-fiber fusion splicer using a fiber holder system)
        FSM-11R (Mass fusion micro splicer for splicing up to 4 fibers)
        FSM-11S (Single-fiber micro fusion splicer using a fiber holder system)
        FSM-30R12 (Mass fusion splicer for splicing up to 12 fibers)
It is also compatible with other splices models
10. Splicer Compatibility & Connector Assembly Notes
a. Installation of the FICS for 250 um & 900 um coated fibers is not anticipated to require splicer modification.
b. The FICS connector inner assembly is placed into the splicer pre-loaded in a special holder.
c. The connector assembly includes a short crimp body with a threaded end.
d. The 250 or 900 um coated fiber is loaded into the splicer with a standard fiber holder.
e. A conventional heat shrink sleeve is used to protect the splice.
f. The FICS connector holder is transferred to a special tube heater to shrink the protection sleeve.
g. The special tube heater shall be capable of drawing power from the hot jacker stripper cord.
h. The tube heater has a button or feature to extract the connector from the holder after splice protection.
i. An extender tube is threded onto the end of the crimp body to secure the splice sleeve.
j. A conventional boot is installed onto the end of the extender tube.
k. The connector outer shell is installed to complete connector assembly.
11. An FICS modification kit for the following additional splicer models is also within the scope of invention:
        FSM-17S (Single-fiber fusion splicer using the sheath-clamp system)
        FSM-16S (Single-fiber fusion splicer using the sheath-clamp system)
The FICS modification kit for these splicers will be used to convert
these splicers from a sheath-clamp system to a fiber holder system.

Example 2

The following is one example of the specifications of a spliced-on connector system according to another exemplary embodiment of the present invention:

---

Fusion-Installable Connector System (FICS)
SC/APC and SC/UPC for 2 mm and 3 mm jacketed cords (FICS Enhanced)

---

1. FICS connector variants
a. Single fiber connectors
a. 1 SC/APC
a. 2 SC/UPC
2. FICS connector dimensional and intermaleability requirements
a. FICS SC/UPC and SC/APC connectors shall meet the dimensional reqiuirements of TIA/EIA-804-3 (FOCIS-3) Fiber Optic Intermaleability Standard
b. FICS Hardened Fiber Optic Connector (SC/APC and SC/UPC) shall meet the dimensional requirements of GR-3120.
3. Cordage Requirements
a. SC/UPC and SC/APC FICS connector designs must be able to terminate the following cordage types
a. 1 2.0 mm kevlar reinforced simplex cable (Media Type I per GR-326-CORE issue 3)
a. 2 3.0 mm kevlar reinforced simplex cable (Media Type I per GR-326-CORE issue 3)
4. FICS connectors shall meet the following optical performance requirements
a. FICS SC/UPC and SC/APC connectors

| | |
|---|---|
| a. 1 New Product | Maximum Loss = 0.40 dB and Mean Loss = 0.20 dB |
| | Minimum Reflectance = −55 dB (SC/UPC) and −60 dB (SC/APC) |
| a. 2 During Test, Not Under Test | Maximum Loss = 0.50 dB, Mean Loss = 0.30 dB, Loss Increase = 0.30 dB |
| | Minimum Reflectance = −55 dB (SC/UPC) and −60 dB (SC/APC) |
| | Reflectance increase = 5 dB |
| a. 3 During Test, Under Load | Loss Increase = 0.50 dB |
| | Reflectance Increase = 5 dB |
| a. 4 End of Test | Maximum Loss = 0.50 dB and Mean Loss = 0.30 dB |
| | Minimum Reflectance = −55 dB (SC/UPC) and −60 dB (SC/APC) |

5. The endface geometry the FICS connector must be compliant to GR-326-CORE issue 3 section 4.4.5
6. Operating Temperature and Humidity = −40 C. to 85 C. and 0-90% RH
7. Storage Temperature and Humidity = −40 C. to 85 C. and 0-90% RH
8. The FICS SC/UPC and SC/APC connector must be compliant to all GR-326-CORE issue 3 requirements except as noted below:
a. Flex Test (GR-326-CORE issue 3 section 4.4.3.2)
a. 1 Reduce tensile to 1 lbf.
b. Twist Test (GR-326-CORE issue 3 section 4.4.3.3)
b. 1 Reduce load in section 4.4.3.3.c as follows:
    Media Type I 1.5 lbf
b. 2 Reduce capstan rotations per table 4-8 as follows

| Media Type | X | Y |
|---|---|---|
| Type I | 1.5 | 3 | c. Proof Test (GR-326-CORE issue 3 section 4.4.3.4)
c. 1 Reduce straight pull tensile load to 5 lbf and 7.5 lbf respectively.
c. 2 Reduce side pull tensile load to 1.5 lbf and 3 lbf respectively.
d. Transmission with Applied Tensile Load (GR-326-CORE issue 3 section 4.4.3.5)
d. 1 Reduce the transmission with applied tensile load per Table 4-9 as follows:

| Media Type I | 0 | 90 |
|---|---|---|
| 0.5 lbf | X | X |
| 1.5 lbf | X | X | e. Connector Installation (GR-326-CORE issue section 4.4.5)
e. 1 The maximum connector length shall be 70 mm (ferruel tip to boot)
9. A FICS upgrade kit may be required, depending upon the design of the connector for 2 mm and 3 mm cords.
The FICS connector splice is compatible with at least the following splicer models:
    FSM-50R12 (Mass fusion spicer for splicing up to 12 fibers)
    FSM-17R (Mass fusion spicer for splicing up to 4 fibers)
    FSM-17S-FH (Single-fiber fusion splicer using a fiber holder system)
    FSM-11R (Mass fusion micro splicer for splicing up to 4 fibers)
    FSM-11S (Single-fiber micro fusion splicer using a fiber holder system)
    FSM-30R12 (Mass fusion splicer for splicing up to 12 fibers)
It is also compatible with other splices models
10. An FICS modification kit for the following additional splicer models is also within the scope of invention:
    FSM-17S (Single-fiber fusion splicer using the sheath-clamp system)
    FSM-16S (Single-fiber fusion splicer using the sheath-clamp system)

Example 3

The following is one example of the specifications and method of producing a spliced-on connector system according to still another exemplary embodiment of the present invention:

---

Fusion-installable Connector System (FICS)
SC/APC and SC/UPC flat drop cables (FICS Hardened)

---

1. FICS connector variants
a. Single fiber connectors
a. 1 Hardened Fiber Optic Connector SC/APC
a. 2 Hardened Fiber Optic Connector SC/UPC
2. FICS connector dimensional and intermaleability requirements
a. FICS Hardened Fiber Optic Connector (SC/APC and SC/UPC) shall meet the dimensional requirements of GR-3120
3. Cordage Requirements
a. Hardened Fiber Optic Connector SC/APC
a. 1 1F FTTX Flat Drop Cable with All Dielectric Sheath
a. 2 1F FTTX Flat Drop Tonables Cable with All Dielectric Sheath
4. FICS connectors shall meet the following optical performance requirements
a. FICS Hardened Fiber Optic Connector (SC/UPC and SC/APC)

| | |
|---|---|
| a. 1 New Product | Maximum Loss = 0.40 dB and Mean Loss = 0.20 dB |
| | Minimum Reflectance = −55 dB (SC/UPC) and −60 dB (SC/APC) |
| a. 2 During Test, Not Under Test | Maximum Loss = 0.50 dB, Mean Loss = 0.30 dB, Loss Increase = 0.30 dB |
| | Minimum Reflectance = −55 dB (SC/UPC) and −60 dB (SC/APC) |
| | Reflectance increase = 5 dB |
| a. 3 During Test, Under Load | Loss Increase = 0.50 dB |
| | Reflectance Increase = 5 dB |
| a. 4 End of Test | Maximum Loss = 0.50 dB and Mean Loss = 0.30 dB |
| | Minimum Reflectance = −55 dB (SC/UPC) and −60 dB (SC/APC) |

5. The endface geometry the FICS connector must be compliant to GR-326-CORE issue 3 section 4.4.5
6. Operating Temperature and Humidity = −40 C. to 85 C. and 0-90% RH
7. Storage Temperature and Humidity = −40 C. to 85 C. and 0-90% RH
8. The FICS connector must be compliant to all GR-3120-CORE issue 1 requirements except as noted below:
a. Flex Test (GR-3120-CORE issue 1 section 4.3.1)
a. 1 Reduce tensile to 5 lbf.
b. Proof Test (GR-3120-CORE issue 1 section 4.3.3)
b. 1 Reduce all loads by 50%
c. Transmission with Applied Tensile Load (GR-3120-CORE issue 1 Section 4.3.4)
c. 1 Reduce the transmission with applied tensile load per Table 4-5 as follows:

| Media Type I | 0 | 90 |
|---|---|---|
| 0.5 lbf | X | X |
| 1.5 lbf | X | X |
| Media Type II and III | | |
| 0.5 lbf | X | X |

9. The FICS connector splice is compatible with at least the following splicer models:
    FSM-50R12 (Mass fusion splicer for splicing up to 12 fibers)
    FSM-17R (Mass fusion splicer for splicing up to 4 fibers)
    FSM-17S-FH (Single-fiber fusion splicer using a fiber holder system)
    FSM-11R (Mass fusion micro splicer for splicing up to 4 fibers)
    FSM-11S (Single-fiber fusion splicer using a fiber holder system)
    FSM-30R12 (Mass fusion splicer for splicing up to 12 fibers)
It is also compatible with other splicer modules
10. Splicer Compatibility & Connector Assembly Notes
a. Installation of the hardened FICS for flat drop cable is not anticipated to require splicer modification.
a. 1 The longer connector allows installation without need for the drop cable inside the splicer wind protector.
a. 2 This allows use of an unmodified fusion splicer.
b. The FICS connector inner body is loaded into the splicer with a special holder.
c. The flat cable is removed just outside the splicer wind protector.
d. The 250 or 900 um coated fiber is loaded into the splicer with a special fiber holder.
e. The special fiber holder also holds the splice protection sleeve during splicing operation.
d. A conventional heat shrink sleeve is used to protect the splice.
e. The FICS connector holder is transferred to a special tube heater to shrink the protection sleeve.
f. The special tube heater shall be capable of drawing power from the hot jacker stripper cord.
g. A two piece clam-shell connector inner body is attached to the crimp body.
h. The clam-shell inner body protects the splice sleeve and forms the main structure of the connector.
i. The clam-shell grabs and secures the two strength members of the flat drop cable.
j. It is desirable to avoid curing operations in the field, but some form of connector sealant may be required.
11. An FICS modification kit for the following additional splicer models is also within the scope of invention:
    FSM-17S (Single-fiber fusion splicer using the sheath-clamp system)
    FSM-16S (Single-fiber fusion splicer using the sheath-clamp system)

Example 4

The following is one example of the specifications of a spliced-on connector system according to still another exemplary embodiment of the present invention:

---

Fusion-installable Connector System (FICS)
For flat drop ribbon cables (FICS Ribbon)

---

1. FICS connector variants
a. Ribbon connectors
a. 1 12-fibers
a. 2 4-fibers
2. FICS connector dimensional and intermaleability requirements
b. FICS Hardened Fiber Optic Connector (SC/APC and SC/UPC) shall meet the dimensional requirements of GR-3120.
3. Cordage Requirements
b. Hardened Fiber Optic Connector SC/APC
b. 1 1F FTTX Flat Drop Cable with All Dielectric Sheath
b. 2 1F FTTX Flat Drop Tonable Cable with All Dielectric Sheath
4. FICS connectors can meet the following optical performance requirements
b. FICS Hardened Fiber Optic Connector (SC/UPC and SC/APC)
b. 1 New Product             Maximum Loss = 0.40 dB and Mean Loss = 0.20 dB
                             Minimum Reflectance = −55 dB (SC/UPC) and −60 dB (SC/APC)
b. 2 During Test, Not Under Test   Maximum Loss = 0.50 dB, Mean Loss = 0.30 dB, Loss Increase = 0.30 dB
                             Minimum Reflectance = −55 dB (SC/UPC) and −60 dB (SC/APC)
                             Reflectance increase = 5 dB
b. 3 During Test, Under Load  Loss Increase = 0.50 dB
                             Reflectance Increase = 5 dB
b. 4 End of Test             Maximum Loss = 0.50 dB and Mean Loss = 0.30 dB
                             Minimum Reflectance = −55 dB (SC/UPC) and −60 dB (SC/APC)
5. The endface geometry the FICS connector must be compliant to GR-326-CORE issue 3 section 4.4.5
6. Operating Temperature and Humidity = −40 C. to 85 C. and 0-90% RH
7. Storage Temperature and Humidity = −40 C. to 85 C. and 0-90% RH
8. The FICS connector will be compliant to all GR-3120-CORE issue 1 requirements except as noted below:
a. Flex Test (GR-3120-CORE issue 1 section 4.3.1)
a. 1 Reduce tensile to 5 lbf.
b. Proof Test (GR-3120-CORE issue 1 section 4.3.3)
b. 1 Reduce all loads by 50%
c. Transmission with Applied Tensile Load (GR-3120-CORE issue 1 section 4.3.4)
c. 1 Reduce the transmission with applied tensile load per Table 4-5 as follows:
    Media Type I        0        90
    0.5 lbf             X        X
    1.5 lbf             X        X
9. The FICS connector splice will be compatible with at least the following splicer models:
    FSM-50R12 (Mass fusion splicer for splicing up to 12 fibers)
    FSM-17R (Mass fusion splicer for splicing up to 4 fibers)
    FSM-11R (Mass fusion micro splicer for splicing up to 4 fibers)
    FSM-30R12 (Mass fusion splicer for splicing up to 12 fibers)
It will also be compatible with other splicer models.

---

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A spliced-on connector system comprising:
   a connector body;
   an incoming fiber which is spliced to the connector body;
   a heat shrinkable splice sleeve which covers a splice point at which the incoming fiber is spliced to the connector body; and
   an extender tube which covers the splice sleeve and abuts the connector body;
   a relief boot which is one of crimped and pressed to an end portion of the extender tube which covers the incoming fiber.

2. The spliced-on connector system according to claim 1, wherein the connector body comprises a section of fiber which is spliced to the incoming fiber.

3. The spliced-on connector system according to claim 2, wherein the heat shrinkable splice sleeve is heat-shrunk around the incoming fiber, the section of fiber, and the splice point.

4. The spliced-on connector system according to claim 2, wherein the section of fiber is glued to a connector portion of the connector body.

5. The spliced-on connector system according to claim 1, wherein the extender tube is one of press-fit, interference-fit, crimped, and thread to the connector body.

6. A method of producing a spliced-on connector system comprising:
   splicing an incoming fiber to a connector body;
   covering, with a heat shrinkable splice sleeve, a splice point at which the splicing is performed; and
   covering the splice sleeve with an extender tube, the extender tube abutting the connector body;
   one of crimping and pressing a relief boot to a fiber end portion of the extender tube which covers the incoming fiber.

7. The method of producing a spliced-on connector system, according to claim 6, wherein the attaching comprises one of press-fitting, interference-fitting, crimping, and threading the extender tube to the connector body.

8. The method of producing a spliced-on connector system according to claim 6, further comprising:

before the covering the splice sleeve with the extender tube, heat-shrinking the splice sleeve over the splice point, the incoming fiber, and a section of fiber of the connector body.

9. The method of producing a spliced-on connector system according to claim 8, further comprising:

before the splicing, sliding the splice sleeve over a jacket.

10. The method of producing a spliced-on connector system according to claim 9, further comprising:

one of crimping and pressing a relief boot to a fiber end portion of the extender tube which covers the incoming fiber, wherein Kevlar fibers of the jacket are arranged over the extender tube, and wherein the one of crimping and pressing comprises one of crimping and pressing the relief boot and a Kevlar retention sleeve over the jacket.

11. The method of producing a spliced-on connector system according to claim 9, wherein an inner diameter of the splice sleeve is greater than an outer diameter of the jacket.

\* \* \* \* \*